United States Patent [19]
Simington

[11] 3,880,018
[45] Apr. 29, 1975

[54] CHAIN SAW SHARPENER
[76] Inventor: Jack F. Simington, Box 141, Star Route, Chiloquin, Oreg. 97624
[22] Filed: Aug. 30, 1973
[21] Appl. No.: 392,889

[52] U.S. Cl............................ 76/25 A; 76/37; 76/43
[51] Int. Cl............................................. B23b 63/16
[58] Field of Search........................ 76/25 A, 37, 43

[56] References Cited
UNITED STATES PATENTS

| | | | |
|---|---|---|---|
| 1,748,686 | 2/1930 | Strehle | 76/43 |
| 2,353,956 | 7/1944 | Enholm | 76/43 |
| 2,410,828 | 11/1946 | Lofstrand | 76/43 |
| 3,695,123 | 10/1972 | Silvey | 76/25 A |

*Primary Examiner*—Leonidas Vlachos
*Attorney, Agent, or Firm*—Clarence O'Brien; Harvey B. Jacobson

[57] ABSTRACT

An upstanding support is provided and a rotary grinding head is journaled from the upper end of the support for rotation about an inclined axis. A pair of chain support mounts are mounted on the upright support on opposite sides of an upstanding plane in which the axis of rotation of the rotary grinding head is disposed and the chain support mounts are mounted for rectilinear horizontal shifting along a path normal to the aforementioned plane and disposed in a second plane normal to the first-mentioned plane, paralleling the axis of rotation of the rotary head and extending along a chord of the rotary grinding head. Each of the chain support mounts includes structure for supporting a length of saw chain therefrom and the support mounts may be advanced toward and away from opposite side peripheral portions of the rotary grinding head whereby right-handed teeth may be sharpened on one side of the rotary head and left-handed teeth may be sharpened on the other side of the rotary head in order to insure identical grinding of both the right-hand and left-hand teeth on a length of saw chain being sharpened.

9 Claims, 8 Drawing Figures 3,880,018

1

CHAIN SAW SHARPENER

The chain saw sharpening device of the instant invention includes a structure whereby an endless saw chain may be readily supported and the cutting teeth thereof each may be moved into precisely the same contact with a rotary grinding head, including both the right-hand and left-hand teeth of the saw chain.

In addition, the chain sharpening device includes various adjustment structures whereby the sharpening device may be adjusted in accordance with the type of chain to be sharpened and the wear experienced by the chain to be sharpened.

Heretofore saw chain sharpening devices have been provided whereby both the right and left hand teeth of a saw chain may be sharpened. However, in order to sharpen a chain in a manner such that it may cut in a perfectly even manner precisely the same bevel and depth of bevel must be formed not only on each cutting tooth on one side of the chain but the same bevel and depth of bevel must also be formed on the cutting teeth on the other side of the chain. While there are most certainly means by which such precise sharpening of a saw chain may be carried out, these methods include extremely complex structure and considerable time must be spent in sharpening the saw chain. Of course, there becomes a point at which the expense of machinery and the time spent in sharpening a saw chain to substantially perfect precision becomes uneconomical and the cost of precisely sharpening a saw chain approaches the cost of a new chain. Accordingly, less expensive and complex structure and less time is most often used in sharpening a saw chain with the result that the saw chain is sharpened to a usable but less than perfect condition.

Accordingly, the main object of this invention is to provide a simple apparatus through the utilization of which a chain saw may have each of the cutting teeth thereof, on both the right-hand and the left-hand sides, sharpened in exactly the same manner with a minimum of labor.

Another object of this invention, in accordance with the immediately preceding object, is to provide a saw sharpening device which may be readily adjusted for use in conjunction with various types of saw chains.

A still further object of this invention is to provide a saw chain sharpening device of the type including a rotary grinding head and provided with means for trueing the rotary grinding wheel of the grinding head and making the necessary adjustments to compensate for material removed from the grinding wheel preparatory to again resuming saw chain sharpening operations.

Another important object of this invention is to provide a saw chain sharpening device which may be utilized by persons possessing less than the usual amount of skill required to properly sharpen a saw chain.

A final object of this invention to be specifically enumerated herein is to provide a saw chain sharpening device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
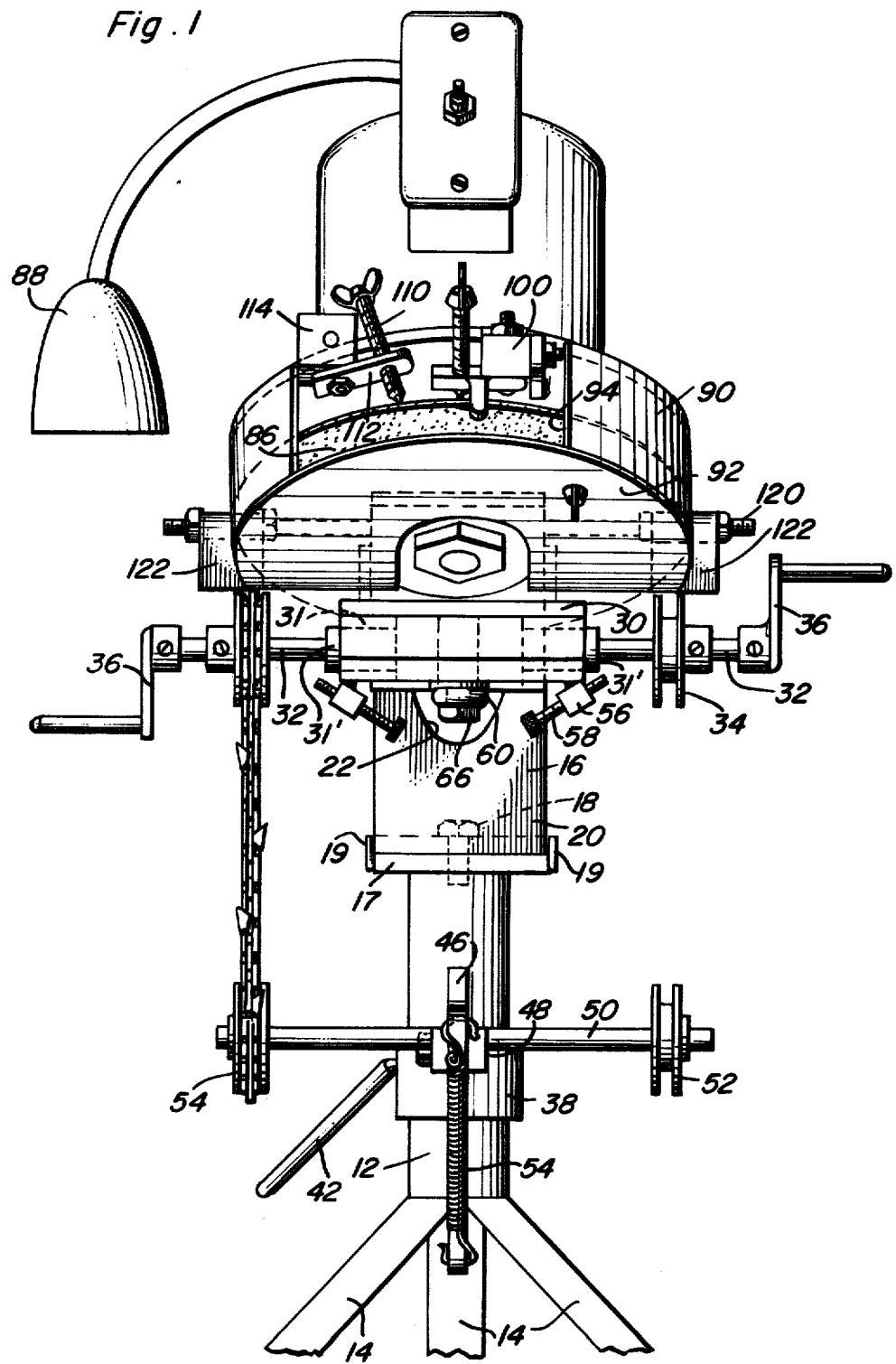
FIG. 1 is a fragmentary elevational view of the upper portion of the chain saw sharpening device of the instant invention illustrating the saw chain supporting structure and grinding head.

Referring now more specifically to the drawings, the numeral 10 generally designates the saw chain sharpening device of the instant invention. The device 10 includes an upstanding support 12 including lower end support legs 14 and a preformed support head 16 removably supported on a plate 17 carried by the upper end of the standard 12 between upstanding side flanges 19 of the plate by means of suitable fastener 18. The support head 16 includes an upstanding flange 20 having a window 22 formed therein and the upper end of the flange 20 has a V-shaped mounting bracket 24 supported therefrom including a horizontal flange portion 26 and an inclined flange portion 28. The forward extremity of the flange 26 of the mounting bracket 24 includes a horizontal transverse angle iron mounting member 30 supporting a pair of opposite end bushing housings 31 having bushings 31' disposed therein through which a support shaft 32 is rotatably and axially slidably received. The opposite end portions of the shaft 32 have grooved wheels 34 mounted thereon defining chain support mounts and each end of the shaft 30 is provided with a crank 36.

Figure 2:
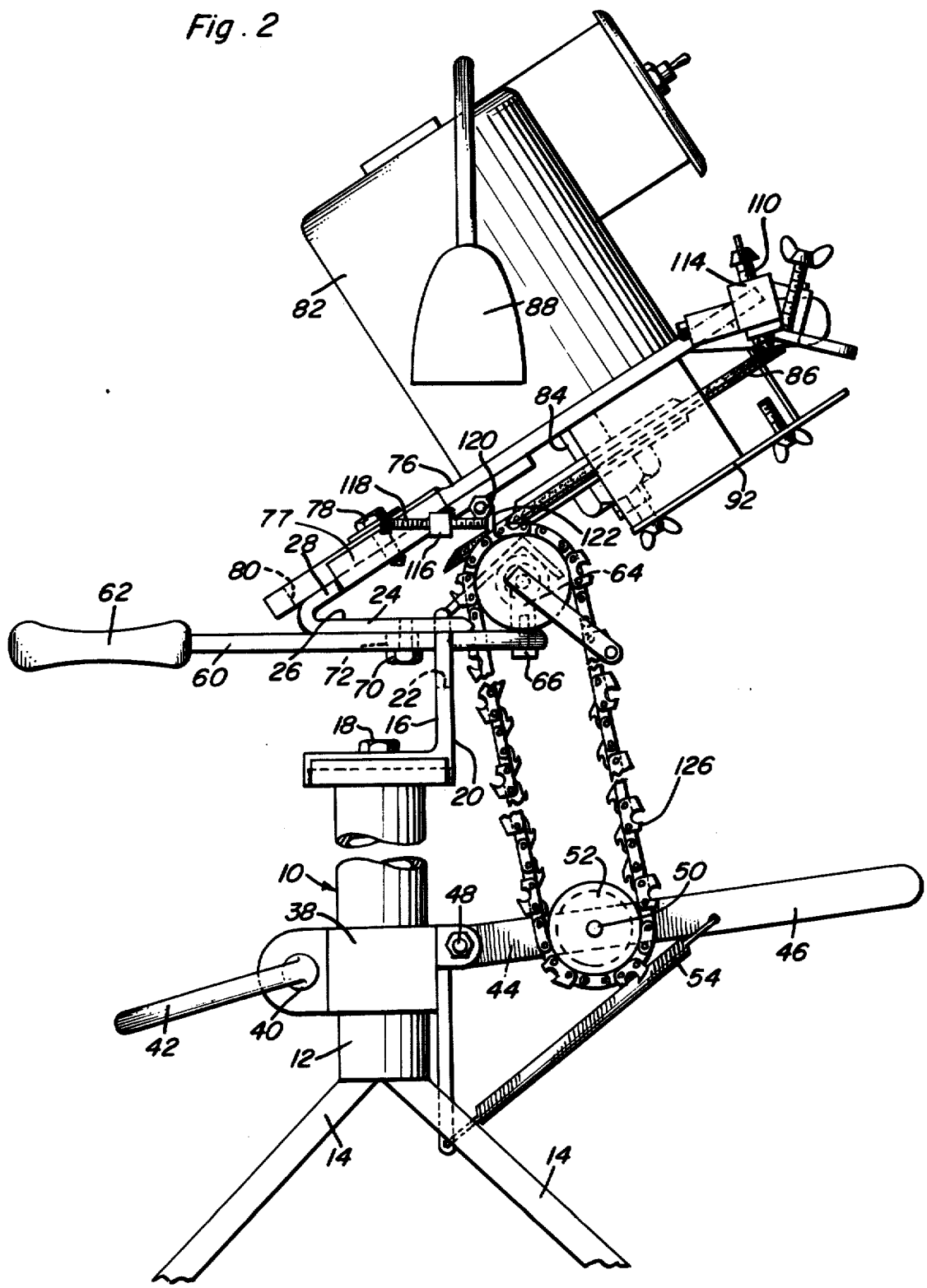
FIG. 2 is a fragmentary side elevational view of the assemblage illustrated in FIG. 1 as seen from the left side thereof.
Figure 3:
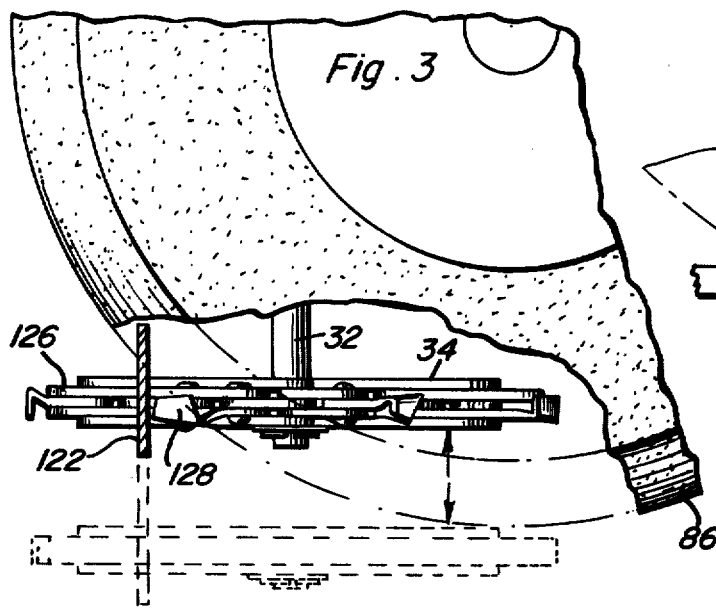
FIG. 3 is a fragmentary enlarged plan view illustrating the manner in which the saw chain sharpening device is operative to properly position a cutting tooth in engagement with the rotary grinding wheel of the sharpening device, portions of the rotary grinding wheel being broken away and an alternate position of the saw chain supporting structure being illustrated in phantom lines.

The standard or support 12 has a mounting clamp sleeve 38 disposed thereon and the sleeve 38 is provided with an operating screw 40 including a crank handle 42 whereby the mounting clamp sleeve 38 may be loosened, shifted along the standard 12 and thereafter tightened for semi-permanent positioning on the standard 12. The side of the mounting clamp sleeve 38 remote from the screw 40 has one end 44 of a lever arm 46 pivotally secured thereto by means of a pivot fastener 48. An intermediate portion of the lever arm 46 has a support shaft 50 journaled and slidably received therethrough and the opposite ends of the shaft 50 have grooved support wheels 52, corresponding to the wheels 34, mounted thereon. Also, an expansion spring 54 is connected between the free end portion of the lever arm 46 and one of the support legs 14 whereby the free end of the lever arm 46 is yieldingly biased downwardly in a clockwise direction as viewed in FIG. 2 of the drawings.

The opposite ends of the angle iron mounting member 30 include upwardly divergent threaded support sleeves 56 through which abutment screws 58 are threaded and the upper ends of the abutment screws 58 are disposed inwardly of and are engageable by the inner sides of the support wheels 34 to limit movement of the support wheels 34 toward a center plane containing the support 10 and disposed normal to the shaft 32.

An operating handle 60 is provided with a handle grip 62 on one end and the other end is pivotally attached to the lower end of an upstanding member 64 by means of a suitable fastener 66. The upper end of the member 64 is attached to the shaft 32. In this manner, oscillation of the handgrip 62 in a horizontal direction will cause inverse reciprocation of the shaft 32, the mid-portion of the handle 60 being pivotally attached to the underside of the horizontal flange portion 26 by means of a pivot fastener 70 secured through an elongated opening 72 formed in the handle 60.

A longitudinally slotted mounting plate 76 is secured to the upper surface of the inclined flange portion 28 between the upstanding side flanges 77 thereof by means of a threaded fastener 78 secured through the slot 80 in the mounting plate 76 and threadedly engaged in the flange portion 28. The mounting plate 76 mounts a reversible electric motor 82 including a rotary output shaft 84 inclined approximately 32° relative to the vertical and disposed in a vertical plane normal to the shafts 32 and 50. A beveled grinding wheel 86 is mounted on the output shaft 84 and a gooseneck lamp 88 is mounted atop the motor 82.

A partial cylindrical shield 90 is supported from the mounting plate 76 and includes a partial bottom wall 92 having a front window 94 formed therein and the shield 90 surrounds the forward half of the grinding wheel 86. Further, a first grinding wheel trueing member or dresser 96 is threadedly secured through a T-shaped mount 98 oscillatably supported from a mounting block 100 by means of a pivot fastener 102 and the mounting block 100 is in turn oscillatably supported from a support flange 104 carried by the mounting plate 76. The axis of rotation of the T-shaped mount 98 relative to the mounting block 100 defined by the pivot fastener 102 is disposed at substantially right angles relative to the axis of oscillation of the mounting block 100 relative to the support flange 104 defined by the fastener 106. Accordingly, the dresser 96 may have its point 108 moved in relation to the periphery of the grinding wheel 86 so as to true the outer periphery of the grinding wheel. Also, a second similar dresser 110 is threadedly secured through a support arm 112 oscillatably supported from a mounting block 114 corresponding to the mounting block 100 and the mounting block 114 is oscillatably supported from the mounting plate 76. Accordingly, the dresser 110 may also be utilized to dress the grinding wheel.

A mounting sleeve 116 is internally threaded and supported from each side of the mounting plate 76 and has an abutment screw 118 threadedly secured therethrough. In addition, each side of the mounting plate 76 includes a horizontally outwardly projecting support shank 120 upon which a flat type abutment member 122 is journaled. The rear surface of each abutment member 122 is disposed for engagement by the forward end of the corresponding abutment screw 118 and thus rearward swinging of each abutment member 122 may be limited as desired.

In operation, after the grinding wheel 86 has been properly dressed, the mounting plate 76 is adjusted in position by loosening the fastener 78 and sliding the mounting plate 76 relative to the inclined flange portion 28 until the output shaft 84 is positioned approximately 1⅜ from the center of the shaft 32. Then, the fastener 78 is tightened to secure the mounting plate 76 in position. Thereafter, assuming that the abutment screws 118 have been properly adjusted to limit rearward swinging of the abutment flaps or members 122, a saw chain such as the saw chain 126 is placed on one pair of wheels 34 and 52 after the forward free end of the lever arm 46 has been raised. Then, the free end of the lever arm 46 may be released so as to be urged downwardly by the biasing action of the spring 54 whereby the chain 126 will be tensioned. Thereafter, one of the cranks 36 may be turned so as to rotate the shaft 32 in a clockwise direction as viewed in FIG. 2 of the drawings until such time as one of the cutting teeth pass beneath the free swinging end of the corresponding abutment member 122. Then, the shaft 32 is rotated in the reverse direction so as to position the cutting tooth rearward against the abutment flap or member 122. Then, with the shaft 32 held stationary, the motor 82 may be actuated in the proper direction and the handle 60 may be horizontally oscillated to shift the shaft 32 in an axial direction to bring the properly positioned cutting tooth into engagement with the periphery of the rotating grinding wheel 86.

Of course, after each cutting tooth on one side of the chain 126 is sharpened, the lever arm 46 is raised and the chain 126 is shifted in position to the other pair of corresponding wheels 34 and 52 after which the free end of the lever 46 may be released so as to again tension the chain 126. Thereafter, the cutting teeth on the other side of the chain 126 may be sharpened in a similar manner.

Figure 4:
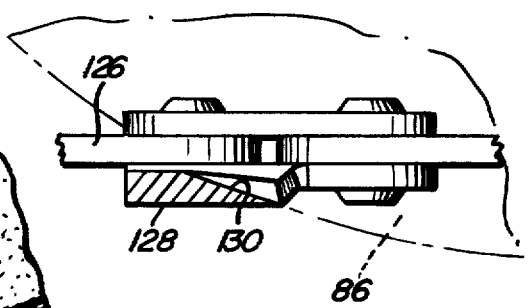
FIG. 4 is an enlarged fragmentary horizontal sectional view taken substantially upon a plane passing through one of the cutting teeth of the saw chain positioned to be sharpened by the grinding wheel, the grinding wheel being illustrated in phantom lines.
Figure 5:
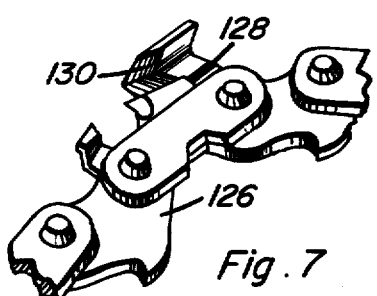
FIGS. 5 and 6 are fragmentary perspective views of two different portions of a saw chain sharpened by the sharpening device of the instant invention.
Figure 6:
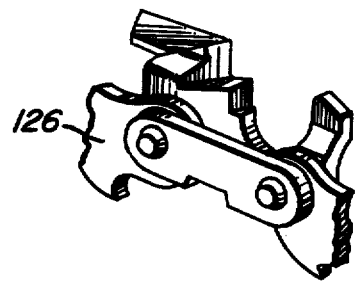
Figure 7:
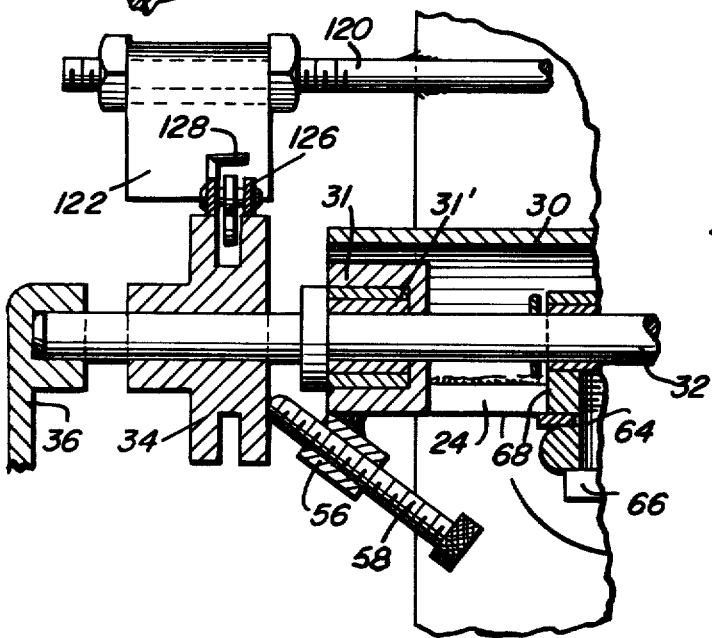
FIG. 7 is an enlarged fragmentary vertical sectional view taken substantially upon a plane passing through a portion of the saw chain support structure of the instant invention.
Figure 8:
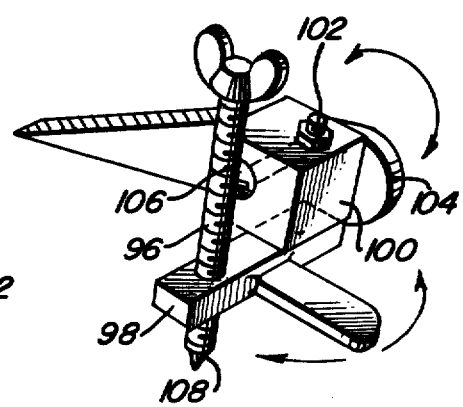
FIG. 8 is a perspective view of one of the grinding wheel trueing members of the instant invention illustrating the universal supporting of the grinding wheel trueing member.

From FIG. 4 of the drawings it may be seen that precise adjustment of a tooth 128 of the chain 126 may be accomplished in order to properly bevel the edge 130 of the tooth 128.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A chain saw sharpening device comprising a support, a rotary grinding head journalled from said support, a pair of chain support mounts mounted on said support on opposite sides of said head for shifting along a path extending transversely of the axis of rotation of said head and contained in a plane paralleling said axis and containing a chord of the outer periphery of said head, each of said chain support mounts including means for support of a length of saw chain therefrom, said chain support mounts comprising pulley wheels journalled for rotation about axes at least generally paralleling said path.

2. The combination of claim 1 wherein the last-mentioned axes coincide with said path.

3. The combination of claim 1 wherein said chain support mounts are mounted on opposite end portions of a shaft extending along said axis.

4. The combination of claim 3 wherein said shaft is supported from said support for rotation about and shifting along the center axis of said shaft relative to said support.

5. The combination of claim 4 wherein said support includes abutment means adapted to be engaged by teeth on chain sections disposed over said wheels to properly angularly position said teeth relative to the axis of rotation of said shaft for grinding by said grinding head when said chain support mounts are shifted along said path toward said grinding head.

6. The combination of claim 1 including reversible drive means drivingly connected to said grinding head.

7. The combination of claim 6 wherein said support and chain support mounts include coacting means adjustably limiting shifting of said mounts toward a plane normal to said path and containing said axis.

8. The combination of claim 7 wherein said coacting means includes means operative to adjustably limit shifting of said mounts toward said plane.

9. In a chain saw sharpening device of the type designed to simultaneously sharpen the front and underside beveled surfaces of a chain saw tooth and including a support structure and a rotary grinding head journalled from said support structure and including an outer periphery, chain support means including a support wheel provided with structure for supporting a length of saw chain trained over said wheel, said chain support means including means supporting said wheel on said support structure for reciprocal shifting along a first path transverse to said axis and said wheel and for angular adjustment of said wheel about an axis paralleling said path, said path being positioned relative to said head such that a tooth of the chain supported from said wheel and in predetermined angular position about said axis, upon reciprocal shifting of said wheel along said path, will be reciprocated toward and away from said periphery along a second path containing a chord of said head, said support structure including abutment means having an abutment surface paralleling said first and second paths, said abutment means being supported from said support structure for shifting of said abutment surface transversely of said axis and along a third path generally tangent to said wheel and paralleling the plane in which said head rotates, and said abutment means and support structure including coacting adjustable stop means operative to limit movement of said abutment means in said third path away from a plane paralleling said first path and containing the axis of rotation of said head.

* * * * *